United States Patent [19]
Bachle et al.

[11] 3,817,387
[45] June 18, 1974

[54] REVERSE OSMOSIS MEMBRANE END FITTING

[75] Inventors: Wilfred H. Bachle, Long Beach; John L. Richardson; Gilbert Segovia, both of Santa Ana, all of Calif.

[73] Assignee: Philco-Ford Corporation, Blue Bell, Pa.

[22] Filed: July 30, 1973

[21] Appl. No.: 383,976

[52] U.S. Cl.................. 210/321, 210/433, 210/541
[51] Int. Cl............................................. B01d 31/00
[58] Field of Search..................... 210/321, 433, 541

[56] References Cited
UNITED STATES PATENTS
3,421,782   1/1969   Kalish et al....................... 285/248

Primary Examiner—Frank A. Spear, Jr.
Attorney, Agent, or Firm—William E. Johnson; Robert D. Sanborn

[57] ABSTRACT

An end fitting for a delicate reverse osmosis membrane of tubular configuration is disclosed. The end fitting provides a transitional internal support for the membrane in the area of the fitting. Specifically, the end fitting provides a graduated internal support for the membrane as the membrane approaches the fitting to a point at which the membrane overlies a member which provides substantial internal support therefor. In the fitting there is not an abrupt change in support for the membrane from an area of no support to an area of total support over the internal member. By eliminating such a sharp change in support for the membrane, chances for rupture of the membrane in the area of the end fitting are greatly reduced when the membrane is subjected to a small, negative internal pressure.

6 Claims, 2 Drawing Figures

PATENTED JUN 18 1974   3,817,387
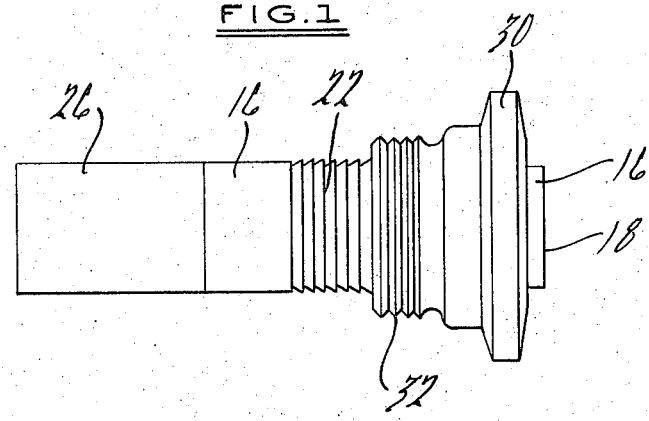
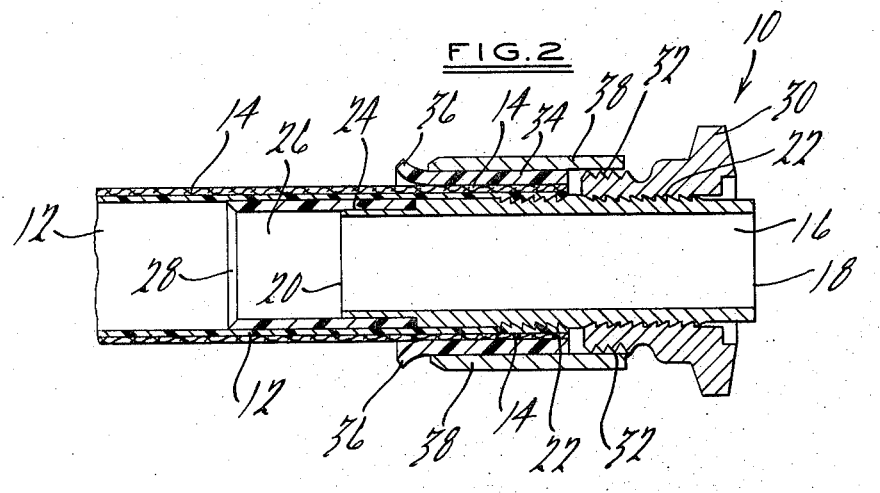

REVERSE OSMOSIS MEMBRANE END FITTING

BACKGROUND OF THE INVENTION

The manufacture of reverse osmosis membranes of tubular configuration is known in the art, see U.S. Pat. No. 3,446,359. In order to make such membranes functionable in a reverse osmosis unit, end fittings must be attached to opposite ends of the membrane. Structures providing end fittings for a delicate reverse osmosis membrane are showed in co-pending U.S. Pat. application Ser. No. 194,123, filed Nov. 1, 1971, and assigned to the same assignee as this application.

Difficulties are sometimes encountered with the use of the type of end fittings disclosed in the above-identified patent application. Briefly, such difficulties are encountered during operation of a reverse osmosis unit at times when a slight negative pressure is developed within the membrane of the unit. In normal operation, the pressure within the membrane is high. At such times, however, as the unit is opened or is draining, a slight internal vacuum may occur within the membrane. During the occurrence of such a slight vacuum, the membrane can be flexed over a sharp edge of the internal metal fitting member making up a portion of the end fitting. A rather sharp bend of the membrane can be made over the internal fitting member. Such flexing and bending sometimes can lead to a tearing or a weakening of the membrane at the flexing and/or bending point. When a subsequent application of internal high pressure is made within the membrane, a leak or a rupture can develop at the point where the flexing and/or bending of the membrane occurred. Also, the membrane at this point may not have the required solute rejection characteristics and may let a great deal of solute therethrough.

This invention provides an end fitting in which the delicate reverse osmosis membrane is supported internally from an area of minimal support to an area of maximum support over a length of generally increasing internal support. The length of internal support is located as the membrane approaches the end fitting. The gradual increase in internal support for the membrane permits some latitude in the development of slight negative pressures within the membrane. With the structure of this invention, the membrane is allowed to flex slightly but it is provided some degree of support and there is no sharp delineation between an unsupported internal area and a fully supported internal area.

SUMMARY OF THE INVENTION

This invention relates to an end fitting for a reverse osmosis membrane, and more particularly, to an end fitting for a reverse osmosis membrane of tubular construction in which the membrane is provided a graduating degree of internal support as the membrane approaches the area of the end fitting in which it has maximum support.

In accordance with the general teachings of this invention, an end fitting for a delicate reverse osmosis membrane of tubular configuration includes an internal fitting member of generally cylindrical configuration having a front end and a back end. The internal fitting member also has serrations extending along a portion of its outer surface. An end fitting element of generally cylindrical construction is provided which has an internal surface swaged against at least a portion of the serrations on the surface of the front end of the internal fitting member. This end fitting element serves as the connecting element to external conduits. The end fitting element also has an external surface area having a plurality of serrations thereon, this surface being at the rear of the end fitting element.

A soft, flexible internal fitting member extension of generally cylindrical construction extends along a rear portion of the internal fitting member. The internal fitting member extension also extends rearwardly from the back end of the internal fitting member a desired distance. This soft, flexible internal fitting member provides the graduated internal support for the delicate reverse osmosis membrane from an area of no support to an area of maximum internal support provided over the internal fitting member.

The delicate reverse osmosis membrane of cylindrical construction extends along a substantial portion of the outer surface of the internal fitting member and engages at least a portion of the internal fitting member's serrations. The reverse osmosis membrane also extends along the entire length of the outer surface of the internal fitting member extension. A generally cylindrical membrane support structure overlies the reverse osmosis membrane on the exterior thereof and extends along the entire length of the membrane to provide a support for the reverse osmosis membrane externally thereof. This support is effective only during times that the reverse osmosis membrane is under a positive internal pressure.

A deformable swaging sleeve is exterior to the membrane supporting structure and is in close confining relationship thereto, the deformable swaging sleeve is positioned to encircle a portion of the outer surface of the internal fitting member. A swaging collar encircles both the deformable swaging sleeve and the plurality of serrations on the external surface area of the end fitting element. The swaging collar is swaged against the deformable swaging sleeve and the plurality of serrations on the end fitting element so that the membrane supporting structure and the deformable swaging sleeve are uniformly and tightly positioned against the internal fitting member and the end fitting element is gripped tightly between the swaging collar and the internal fitting member.

In this construction, the soft, flexible internal fitting member extension provides the support with a graduated degree of flexibility for internally supporting the reverse osmosis membrane from an unsupported area of the membrane up until the membrane overlies and is totally supported internally by the internal fitting member. With such a construction, if a slight negative pressure develops within the reverse osmosis membrane, the membrane will not be bent sharply over the back end of the internal fitting member but will have a graduated support therealong allowing a slight but graduated deforming of the membrane.

BRIEF DESCRIPTION OF THE DRAWINGS

FIG. 1 is a side elevation view of a portion of the end fitting of this invention prior to that portion's insertion within a reverse osmosis membrane.

FIG. 2 is a side elevation, in cross section, of the end fitting of this invention after its insertion within and connection to an externally supported reverse osmosis membrane.

DESCRIPTION OF THE PREFERRED EMBODIMENT

Reference is made to the FIGS. 1 and 2 for the description of the preferred embodiment of an end fitting constructed in accordance with the teachings of this invention. In the drawings, the end fitting is designated generally by the numeral 10. The end fitting is utilized to connect a reverse osmosis membrane 12 to a fluid moving or handling equipment (not shown). The reverse osmosis membrane is of generally tubular configuration and may be constructed as described in U.S. Pat. No. 3,446,359. A generally cylindrical membrane supporting structure 14 overlies the reverse osmosis membrane on the exterior thereof and extends along the entire length of the membrane to provide an external support for the membrane when the membrane is pressurized internally. The supporting structure may be constructed and may be placed on the membrane as taught in co-pending U.S. Pat. application No. 198,612, filed Nov. 15, 1971, and assigned to the same assignee as this application. The material in the co-pending specification No. 198,612 is incorporated herein by reference.

An internal fitting member 16 is provided which is formed of stainless steel. This member has a front end 18 and a back end 20. The internal fitting member also has a plurality of serrations 22 on the external surface thereof, part of which face frontward to grip the end fitting element 30 and part of which faces backward to grip the membrane. The opposite facing of the serration ridges is to provide a more positive grip when under the loads induced at high pressures. An annular recess 24 (FIG. 2 only) is provided at the back end of the internal fitting member.

A soft, flexible internal fitting member extension 26, of generally cylindrical construction and preferably formed of rubber, is vulcanized to the internal fitting member 16 at the annular recess 24 thereof. In such a construction, the flexible internal fitting member extension 26 extends along a rear portion of the internal fitting member and then extends rearwardly from the back end 20 a selected distance. The selected distance is calculated by considering the thickness of the reverse osmosis membrane, its susceptibility to internal collapse and dependence on applied internal negative pressure and the flexibility of the internal fitting member extension. The internal fitting member extension also has a tapering entry. The tapering entry surface 28, for the sake of clarity, is shown as quite abrupt in FIG. 2, however, the tapering entry surface may extend along a substantial portion of the free length of the internal fitting member extension and may extend from its free end with a thickness of 10 to 16 mils to a thickness in the range of 40 mils to 60 mils at the position wherein the extension overlies the annular recess of the internal fitting member.

An end fitting element 30 of generally cylindrical construction is connected to the front end 18 of the internal fitting member 16. The end fitting element may be formed of a material such as fiber glass reinforced polycarbonate and may be attached to the end of the internal fitting member by a molding operation which brings the serrations 22 of the internal fitting member into gripping contact with an internal diameter of the end fitting element. The end fitting element may be connected to outside elements or processing units (not shown) by use of a V-type coupling connector which is well-known in the art and which is described in application Ser. No. 194,123. The end fitting element 30 also has an external serrated surface 32 thereon.

A deformable swaging sleeve 34 is provided which may preferably be formed of a plastic such as unfilled polycarbonate. This deformable swaging sleeve is exterior of the membrane supporting structure 14 and is in close confining relationship thereto. The deformable swaging sleeve is positioned to encircle a portion of the outer surface of the internal fitting member 16. In the perferred embodiment, the deformable swaging sleeve has a free portion 36 which is flared upwardly and outwardly from the membrane supporting structure in the swaging process.

A swaging collar 38 of a deformable metal, such as stainless steel or cupronickel, encircles both the deformable swaging sleeve 34 and the serrated external surface 32 of the end fitting element 30. The swaging collar is swaged against these elements with swaging pressure of 5,000 ± 100 psig so that the membrane supporting structure 14 and the deformable swaging sleeve are uniformly and tightly positioned against the external surfaces of the internal fitting member and in gripping contact with at least a portion of the serrations 22 on the internal fitting member 16. The end fitting element is also gripped tightly between the swaging collar and the internal fitting member 16 so that a leak free coupling area at the end of the unit is provided.

With this construction, the internal fitting member extension 26 provides a graduated degree of support for the reverse osmosis membrane 12 internally of the membrane. This support is provided from an area in which the membrane has no internal support that is to the left of the extension 26 as viewed in FIG. 2, to an area of maximum internal support at the position where the membrane overlies the back end 20 of the internal fitting member 16. At times when the reverse osmosis membrane is accidentally or inadvertently subjected to a slight negative pressure, the membrane will not be bent sharply over the edges of the internal fitting member 16 at the back end thereof to cause ruptures or other breaking of the membrane due to the flexibility of the internal support 26.

With respect to the deformable swaging sleeve 34, the free flaring portion 36 thereon is designed to protect the membrane 12 during pressurized use thereof. The membrane, because of the portion 36, will not be cut or otherwise damaged by being flared outwardly against sharp edges of the swaging collar 38.

The preferred embodiment of this end fitting for a reverse osmosis membrane of this invention has been described herein. In view of this description, it is apparent that those skilled in the art will arrive at many modifications of the end fitting which fall within the true spirit and scope of this invention. It is intended that all such modifications fall within the terms of the claims appended hereto.

We claim:

1. An end fitting for a delicate reverse osmosis membrane of tubular configuration, which end fitting comprises:
   an internal fitting member of generally cylindrical configuration having a front end and a back end, said internal fitting having serrations extending along a portion of its outer surface;

an end fitting element of generally cylindrical construction having an internal surface swaged against at least a portion of said serrations on said surface of said front end of said internal fitting member, said end fitting element having an external surface area having a plurality of serrations therein;

a soft, flexible internal fitting member extension of generally cylindrical construction extending along a rear portion of said internal fitting member and extending rearwardly from said back end of said internal fitting member a distance rearwardly of said back end;

a delicate reverse osmosis membrane of cylindrical construction extending along a substantial portion of said outer surface of said internal fitting member and engaging at least a portion of said last mentioned member's serrations, said reverse osmosis membrane also extending along the entire length of an outer surface of said internal fitting member extension;

a generally cylindrical membrane supporting structure overlying said reverse osmosis membrane on the exterior thereof and extending along the entire length of said membrane to provide a support structure for said reverse osmosis membrane;

a deformable swaging sleeve exterior of said membrane supporting structure and in a close confining relationship thereto, said deformable swaging sleeve being positioned to encircle a portion of said outer surface of said internal fitting member; and a swaging collar encircling both said deformable swaging sleeve and said plurality of serrations on said enternal surface area of said end fitting element, said swaging collar being swaged against said deformable swaging sleeve and said plurality serrations on said end fitting element so that said membrane supporting structure and said membrane and said deformable swaging sleeve are uniformly and tightly positioned against said internal fitting member and said end fitting element is gripped tightly between said swaging collar and said internal fitting member forming a water tight seal, whereby said soft, flexible internal fitting member extension provides a support with a graduate degree of flexibility for said reverse osmosis membrane from an unsupported area of said reverse osmosis membrane up until said membrane overlies said internal fitting member so that a slight negative pressure within the reverse osmosis membrane will not cause said reverse osmosis membrane to be bent sharply over said back end of said internal fitting member.

2. The end fitting of claim 1 wherein: said internal fitting member is made out of metal or plastic, reinforced with fiber glass if necessary, and wherein; said soft internal fitting member extension has its front portion received in an annular recess about the rear end of sid internal fitting member whereby a smooth transition is made between the external surfaces of both said internal fitting member and said internal fitting member extension whereby said reverse osmosis membrane engages a circumferential surface of uniform diameter along the transition between said internal fitting member and said internal fitting member extension.

3. The end fitting of claim 2 wherein:
said internal fitting member extension is formed so that it has a tapering entry surface on the portion thereof not engaging said internal fitting member.

4. The end fitting of claim 3 wherein:
said internal fitting member extension is formed of rubber.

5. The end fitting member of claim 1 wherein:
said deformable swaging sleeve has a portion which extends generally beyond the swaging collar at a portion overlying a back portion of said internal fitting member, said extending portion being flared outwardly from an upwardly from said membrane supporting structure, said extension protecting said membrane supporting structure and said membrane when they are under pressure.

6. The end fitting of claim 5 wherein:
said deformable swaging sleeve is formed of plastic.

* * * * *